UNITED STATES PATENT OFFICE.

SAMUEL ADAM BURKHOLDER AND GEORGE W. WILSON, OF BENDERSVILLE, PENNSYLVANIA.

IMPROVEMENT IN FERTILIZERS.

Specification forming part of Letters Patent No. 88,443, dated March 30, 1869.

*To all whom it may concern:*

Be it known that we, SAMUEL A. BURKHOLDER and GEORGE W. WILSON, both of Bendersville, Adams county, in the State of Pennsylvania, have invented a new and Improved Fertilizer, or Fertilizing Compound, which we call the Star Phosphate; and we hereby declare the following to be a full and complete description thereof.

Our invention consists in compounding or mixing together the following ingredients in about the proportions indicated by the quantities here expressed, to wit: Six hundred pounds (600 lbs.) of bone-dust; two hundred pounds (200 lbs.) of oil of vitriol; one hundred pounds (100 lbs.) of sulphate of soda; ten pounds (10 lbs.) of nitrate of soda; fifty pounds (50 lbs.) of common salt; three hundred pounds (300 lbs.) of ground plaster (sulphate of lime); eighty pounds (80 lbs.) of wood-ashes, and seven bushels (7 bush.) of earth or sand.

If wood-ashes cannot be conveniently obtained, ten pounds of potash may be substituted for it in the above list of ingredients.

Our mode of preparing our improved fertilizing compound is as follows; but of course it may be varied considerably as circumstances, experience, &c., may dictate:

We provide a box adapted to hold conveniently one-half of the quantity expressed in the foregoing list of ingredients, and take in each case one-half of the quantity of each ingredient therein named. Put the bone-dust in the box first, then the sulphate of soda, next the nitrate of soda, make these damp with water, then pour on the oil of vitriol, and as soon as it begins to smoke and turn blue let two men stir it as briskly as possible until the smoking ceases. Now mix together the plaster, ashes, and sand or earth, and then mix this portion of the compound thoroughly with the portion before prepared, as above, and let the whole dry.

As a general rule we recommend the application of three hundred pounds to the acre.

What we claim as our invention, and desire to secure by Letters Patent, is—

The above described fertilizing compound, composed of the ingredients named, in about the proportions herein specified.

SAMUEL ADAM BURKHOLDER.
GEORGE W. WILSON.

Witnesses:
WM. B. WILSON,
THADDEUS SMITH.